United States Patent
Peter et al.

(10) Patent No.: US 9,976,448 B2
(45) Date of Patent: May 22, 2018

(54) REGENERATIVE THERMODYNAMIC POWER GENERATION CYCLE SYSTEMS, AND METHODS FOR OPERATING THEREOF

(71) Applicant: General Electric Company, Schenectady, NY (US)

(72) Inventors: Andrew Maxwell Peter, Saratoga Springs, NY (US); Chiranjeev Singh Kalra, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 420 days.

(21) Appl. No.: 14/725,032

(22) Filed: May 29, 2015

(65) Prior Publication Data
US 2016/0348539 A1   Dec. 1, 2016

(51) Int. Cl.
*F01K 1/00* (2006.01)
*F01K 7/32* (2006.01)
(Continued)

(52) U.S. Cl.
CPC ............ *F01K 7/32* (2013.01); *F02C 1/05* (2013.01); *F02C 6/18* (2013.01); *F01K 23/08* (2013.01);
(Continued)

(58) Field of Classification Search
CPC .. F02C 1/007; F02C 6/18; F02C 1/005; F02C 1/06; F02C 1/10; F01K 23/10; F01K 23/08; F01K 25/103; Y02E 20/16
See application file for complete search history.

(56) References Cited

U.S. PATENT DOCUMENTS

| 3,971,211 | A | 7/1976 | Wethe et al. |
| 8,490,397 | B2 | 7/2013 | Lehar |
| 8,857,186 | B2 * | 10/2014 | Held ............... F01K 25/08 60/655 |
| 2010/0242429 | A1 | 9/2010 | Smith |

(Continued)

FOREIGN PATENT DOCUMENTS

| CA | 2479985 A1 | 3/2006 |
| CA | 2453634 C | 2/2013 |

OTHER PUBLICATIONS

McDonald et al.,"The utilization of recuperated and regenerated engine cycles for high-efficiency gas turbines in the 21st century", Applied Thermal Engineering, ScienceDirect, Aug.-Sep. 1996, vol. 16, Issues 8-9, pp. 635-653.

(Continued)

*Primary Examiner* — Pascal M Bui Pho
*Assistant Examiner* — Katheryn Malatek
(74) *Attorney, Agent, or Firm* — John P. Darling

(57) ABSTRACT

A method for operating a closed loop regenerative thermodynamic power generation cycle system is presented. The method includes supplying a high-temperature working fluid stream at a first pressure $P_1$ to an expander, and extracting a partially expanded high temperature working fluid stream from the expander at a second pressure $P_2$. Each of the first pressure $P_1$ and the second pressure $P_2$, are higher than a critical pressure of the working fluid; and the second pressure $P_2$ is lower than $P_1$. The method further includes regeneratively supplying the extracted high temperature working fluid stream at the second pressure $P_2$ to a low temperature working fluid stream at the first pressure $P_1$. A closed loop regenerative thermodynamic power generation cycle system is also presented.

8 Claims, 5 Drawing Sheets

(51) Int. Cl.
*F02C 6/18* (2006.01)
*F02C 1/05* (2006.01)
*F01K 23/10* (2006.01)
*F01K 25/10* (2006.01)
*F02C 1/06* (2006.01)
*F02C 1/00* (2006.01)
*F02C 1/10* (2006.01)
*F01K 23/08* (2006.01)

(52) U.S. Cl.
CPC ............ *F01K 23/10* (2013.01); *F01K 25/103* (2013.01); *F02C 1/005* (2013.01); *F02C 1/007* (2013.01); *F02C 1/06* (2013.01); *F02C 1/10* (2013.01); *Y02E 20/16* (2013.01)

(56) References Cited

U.S. PATENT DOCUMENTS

| | | | |
|---|---|---|---|
| 2013/0033044 A1* | 2/2013 | Wright | F02C 9/00 290/1 R |
| 2013/0104525 A1 | 5/2013 | Allam et al. | |
| 2014/0050593 A1 | 2/2014 | Vermeersch | |
| 2014/0102101 A1 | 4/2014 | Xie et al. | |

OTHER PUBLICATIONS

Michael J Hexemer.,"Supercritical CO2 Brayton Recompression Cycle Design and Control Features to Support Startup and Operation",The 4th International Symposium—Supercritical CO2 Power Cycles Technologies for Transformational Energy Conversion Sep. 9-10, 2014, Pittsburgh, Pennsylvania, 16 Pages.

* cited by examiner

REGENERATIVE THERMODYNAMIC POWER GENERATION CYCLE SYSTEMS, AND METHODS FOR OPERATING THEREOF

BACKGROUND

Embodiments of the invention generally relate to regenerative thermodynamic cycles, e.g., regenerative Brayton cycles, and more particularly to power generation systems e.g., gas turbine power plants, which use the regenerative Brayton cycles, and methods for operating the systems.

Regenerative thermodynamic cycles are typically implemented in gas turbines and micro-turbines to improve the cycle (e.g., Brayton cycle) efficiency beyond what is otherwise achievable with a simple cycle machine. In current regenerative gas turbine cycles, a partial replacement of the fuel energy is achieved by regeneratively transferring energy from the exhaust gases via heat exchangers to a fluid discharging from the compressor. The compression ratio in such a machine is low enough that the temperature of the exhaust gases leaving the turbine and entering the regenerator is higher than the compressor discharge air to be heated therein. A substantial improvement in the efficiency of the gas turbine cycle has been realized.

Further improvements to these gas turbine cycles have been achieved by using various processes and configurations, for example, multistage compression with intercooling, multistage expansion with reheating, and recompression. However, even in such recuperated and recompression cycles, the thermal efficiency is limited by the fact that the turbine exhaust gas temperature can never be cooled below that of the compressor discharge air, or else the heat will flow in a reverse direction (to the exhaust gases), decreasing the efficiency of the system.

More recently, there has been an increased interest in the use of supercritical working fluids, such as supercritical carbon dioxide, in closed thermodynamic power generation cycles. For example, a supercritical Brayton cycle power generation system offers a promising approach for achieving a higher efficiency and more cost-effective power conversion when compared to the existing steam-driven power plants and gas turbine power plants. A supercritical Brayton cycle using supercritical carbon dioxide as the working fluid, has a lower compression work value than that of a conventional gas Brayton cycle due to the low compressibility of the fluid near the critical point. Furthermore, a supercritical Brayton cycle using supercritical carbon dioxide as the working fluid can be regeneratively heated to a higher temperature than that of a steam Rankine cycle, enabling a higher efficiency.

In order to achieve a high thermodynamic efficiency in a regenerative power cycle, it is desirable to regeneratively heat the working fluid to a temperature higher than its critical temperature. This is challenging because the specific heat of the fluid near its critical temperature is higher than the specific heat of a regenerative fluid. One solution to this challenge is a recompression cycle. In a recompression cycle, a recompressor (i.e., an additional compressor) is generally used to compress a fraction of an exhaust fluid before the heat is removed by a precooler (i.e., when the temperature of the fluid is near the exhaust temperature), and mix it with a cooled and compressed fluid after leaving from a low temperature recuperator. Although the two parallel compressors have quite different inlet conditions, one must operate at nearly the same pressure ratio to avoid impacting the performance of the other compressor. A relatively small difference in the pressure ratio can surge one of the compressors and shutdown the system. Furthermore, while maintaining adequate surge margin, the recompression cycle adds challenges for balancing the performance of the two compressors. In short, the recompression cycle has the potential for improving the efficiency of the system, however the cycle is mechanically complex and difficult to control because of the two separate compressors operating at different conditions.

Therefore, alternative configurations for the regenerative thermodynamic cycles are desirable, which provide advantages over conventional thermodynamic power generation cycles, typically, used in the power generation systems e.g., gas turbine power plants. In particular, alternative regenerative thermodynamic cycles are desirable, which maintain high efficiency without a recompressor.

BRIEF DESCRIPTION

In one embodiment, a method of operating a closed loop regenerative thermodynamic power generation cycle system is provided. The method includes supplying a high-temperature working fluid stream at a first pressure $P_1$ to an expander, and extracting a partially expanded high temperature working fluid stream from the expander at a second pressure $P_2$. Each of the first pressure $P_1$ and the second pressure $P_2$ are higher than a critical pressure of the working fluid; and the second pressure $P_2$ is lower than $P_1$. The method further includes regeneratively supplying the extracted high temperature working fluid stream to a low-temperature working fluid stream at the first pressure $P_1$.

Another embodiment provides a closed loop regenerative thermodynamic power generation cycle system. The system includes a pressurization device configured to pressurize a low temperature working fluid, and to deliver a low temperature working fluid stream at a first pressure $P_1$; a first heat exchanger fluidly coupled to the pressurization device, and configured to transfer heat to the low temperature working fluid stream at the first pressure $P_1$ received from the pressurization device; a second heat exchanger fluidly coupled to the first heat exchanger, and configured to transfer heat to a working fluid stream received from the first heat exchanger; and an expander fluidly coupled to the second heat exchanger, and configured to expand a high temperature working fluid stream at the first pressure $P_1$ to produce a mechanical energy. The first pressure $P_1$ is higher than a critical pressure of the working fluid. The expander includes a first outlet path to extract a partially expanded high temperature working fluid stream from the expander at a second pressure $P_2$ and to regeneratively supply the extracted high temperature working fluid stream at the second pressure $P_2$ to the first heat exchanger; and a second outlet path to provide an exhaust fluid stream from the expander, and to regeneratively supply the exhaust fluid stream at a third pressure $P_3$ to the second heat exchanger. The second pressure $P_2$ is lower than $P_1$, and higher than the critical pressure of the working fluid. The third pressure $P_3$ is lower than $P_2$.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
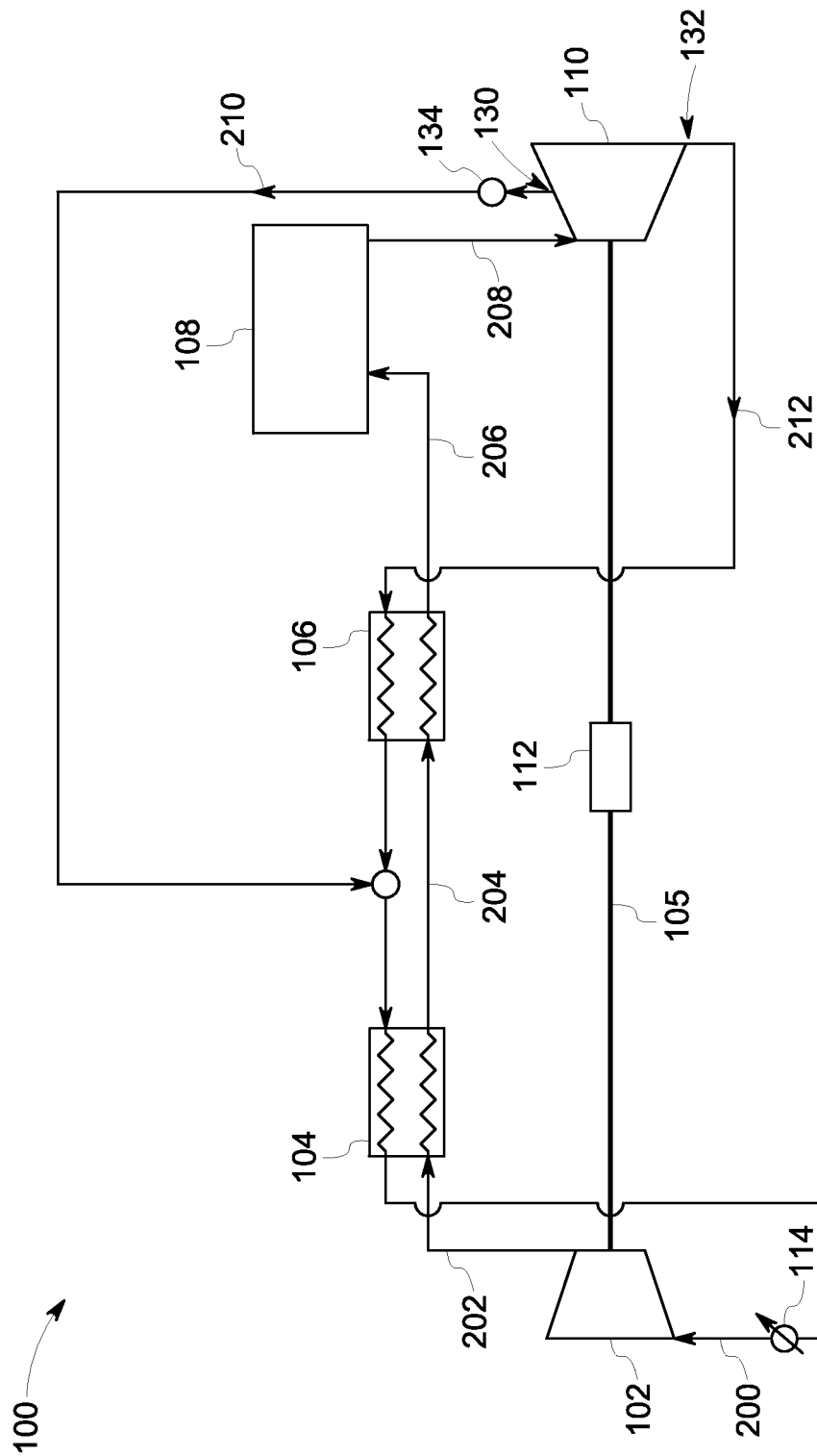
FIG. 1 is a schematic diagram of a regenerative closed loop Brayton cycle power generation system, in accordance with one embodiment of the invention.

In the following specification and the claims, which follow, a reference will be made to a number of terms, which shall be defined to have the following meanings. The singular forms "a", "an" and "the" include plural referents unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value.

Embodiments of the invention relate to a regenerative closed loop Brayton cycle power generation system. The term "closed loop", as used herein, means that the system forms a closed cycle flow path for a working fluid. The working fluid flows in the closed cycle flow path, and does not mix with the ambient or other fluids. As described herein, in a regenerative thermodynamic cycle, a partial replacement of an external thermal energy (that is generally provided by a heat source) is achieved by transferring a fraction of a thermal energy recovered from an exhaust fluid stream from an expander to a low temperature compressed fluid stream. This transfer of the fraction of the thermal energy increases the temperature of the compressed fluid stream after the fluid stream leaves the compressor or compressors, and before entering the expander. The remaining exhaust energy is exhausted from the expander. The heated compressed fluid drives the expander (may also be referred to as a power turbine), which is generally coupled to an electrical generator for producing electrical energy.

To further enhance the performance of the power generation system, a compressor and an expander, as used herein, may respectively include a multistage compressor and a multistage expander. As known in the art, a compression process can be carried out by compressing the working fluid in multiple stages, that is referred to as multistage compression and utilizes the multistage compressor; and an expansion process can be carried out by expanding the working fluid in multiple stages, that is referred to as multistage expansion and utilizes multistage expander. Furthermore, the multistage compression may be performed with or without intercooling the fluid in between the stages; and the multistage expansion may be performed with or without reheating the fluid in between the stages.

A suitable example of the working fluid includes carbon dioxide ($CO_2$). Other examples of the working fluid include air, water, helium, or organic fluids, e.g., isobutene, propane, etc. In some embodiments, the working fluid is a supercritical fluid e.g., supercritical $CO_2$. In some of these embodiments, the system is referred to as a supercritical Brayton cycle power generation system.

A supercritical Brayton cycle power generation system is a power conversion system that uses a supercritical working fluid (or supercritical fluid). As used herein, the term "supercritical fluid" refers to a single-phase fluid in which distinct liquid and gaseous phases do not exist at or above a critical point (a critical temperature and a critical pressure) of the fluid. The term "critical point" of a supercritical fluid refers to the lowest temperature and the lowest pressure at which the substance exists in the supercritical state. The terms "critical temperature and "critical pressure" refer to the temperature and the pressure at the critical point of the supercritical fluid.

The critical temperature and the critical pressure for $CO_2$ are about 304 degrees Kelvin and 7.3 MPa. In some instances, the working fluid may be a mixture of $CO_2$ and at least an additive, e.g., an alkane, neon, nitrogen, helium etc. The mixture can be selected to cause the critical temperature of the fluid to be at a desired temperature, which can be selected based at least, in part, upon an environment around the system, for example ambient temperature, day/night temperature range, humidity proximate to the system, seasonal temperature etc.

Typically, a heat rejection in a supercritical Brayton cycle power generation system occurs when the working fluid conditions are above the critical temperature and the critical pressure of the fluid. In general, the highest cycle efficiency in the supercritical Brayton cycle power generation system occurs when the temperature and the pressure of the working fluid at an inlet of a main compressor of such a generation system is as near to the critical point of the working fluid as possible.

Aspects of the present invention described herein address the noted shortcomings of the state of the art and further improve the performance of a thermodynamic power generation cycle system as compared to the conventional thermodynamic power generation cycle systems. Embodiments of the present invention are directed to an alternative configuration for a regenerative thermodynamic power generation cycle e.g., a Brayton cycle that provides improved cycle efficiency without requiring a recompressor. In this configuration, a fraction of a partially expanded fluid stream is extracted at an intermediate pressure, and regeneratively supplied to a low temperature working fluid stream. An intermediate pressure, as used herein, refers to a pressure value of a partially expanded fluid in an expander (may also be referred to as a turbine), which is usually lower than an exhaust pressure (i.e., the pressure of an exhaust fluid stream leaving the expander) and higher than a pressure of a compressed fluid that enters the expander. This regenerative supply of the extracted fluid to the cycle provides an additional thermal energy to heat (i.e., preheat) the low temperature and high pressure (i.e., compressed) fluid stream from a compressor to a temperature to be suitable for the provision to the expander i.e., as close to the turbine exhaust temperature as possible. Some embodiments of the invention describe systems including the disclosed regenerative thermodynamic power generation cycle, and processes for operating such systems.

As used herein, a high temperature and a low temperature are defined relative to each other. In a thermodynamic cycle, the working fluid is heated and cooled multiple times. A high temperature may be defined as a temperature higher than a relatively low temperature; and a low-temperature may be defined as a temperature lower than a relatively high temperature.

As used herein, the term "near" refers to a value that can be within at least 1% of the precise value specified. In an example, "near the critical point of the fluid" or "near the critical temperature of the fluid" refers to a temperature, a pressure, or both that can be within 1% of the critical point of the fluid. In some embodiments, a temperature, a pressure or both can be within 5% and, in some embodiments, within 10% of the critical point of the fluid. In another example, "near the critical temperature of the fluid" refers to a temperature that can be within 3 degree Kelvin of the critical temperature of the fluid. In some embodiments, the temperature can be within 15 degrees Kelvin and, in some embodiments, within 10 degrees Kelvin of the critical temperature of the fluid.

It should be understood that the process and the system of the present invention are not limited to the above example cycle configuration, but may be applicable to other cycle configurations, e.g., a simple regenerative Brayton cycle; and a simple Rankine cycle and a supercritical Rankine cycle, where the working fluid is condensed before compression.

FIG. 1 illustrates a regenerative closed loop thermodynamic cycle system 100, according to the embodiments of the invention. In one embodiment, the system 100 is a power generation system. In some embodiments, the system 100 includes a supercritical working fluid, such as supercritical carbon dioxide flowing in the closed cycle flow path of the system. In these embodiments, the system 100 represents a supercritical Brayton cycle power generation system. In some other embodiments, the system 100 may represent a supercritical Rankine cycle power generation system. In these embodiments, the system 100 uses a working fluid with a relatively low temperature and pressure, e.g., in liquid state, that can be compressed directly to its supercritical pressure and heated to its supercritical state before the expansion.

As illustrated, the system 100 includes a pressurization device 102, an expander 110 and an electrical generator 112 coupled to each other through a shaft 105. The pressurization device 102 is configured to deliver a pressurized and cooled fluid stream 202 at a pressure above the critical pressure of the fluid. In some embodiments, the pressurization device 102 includes a compressor, which may be an axial, a radial or a reciprocating type. The expander 110 may include a device selected from an axial flow turbine, a radial flow turbine, a reciprocating engine and a combination thereof. Initially, a working fluid stream 200 is supplied to an inlet of the compressor 102. In particular instances, the fluid stream 200 supplied to the compressor 102 is at a pressure and a temperature above its critical point. That is the fluid is supplied to the compressor 102 in its supercritical state.

The compressor 102 is fluidly coupled to the expander 110 such that a partially expanded high temperature fluid stream 210 (described below) from a first outlet 130; and an exhaust fluid stream 212 from a second outlet 132 are directed to the inlet of the compressor 102 through a precooler 114. The fluid stream 200 enters the compressor 102 after the fluid has been expanded, and then cooled; and the compressor 102 compresses such fluid stream 200. After compression, a cool (low-temperature) and compressed fluid stream 202 at a first pressure $P_1$ exits the compressor 102. In one embodiment, the first pressure $P_1$ is above the critical pressure of the fluid i.e., the compressed fluid 202 is in the supercritical state.

In some other embodiments, for example, in a supercritical Rankine cycle, the pressurization device 102 includes a pump and a condenser. In these embodiments, the working fluid stream 200 is supplied to the pressurization device 102 below its critical pressure and temperature, i.e., in its liquid state; and a pressurized fluid stream at a pressure above the critical pressure of the fluid is delivered from the pressurization device.

The compressor 102 is further fluidly coupled to the expander 110 such as to supply the compressed fluid streams 202 to the expander 110. As illustrated, an outlet of the compressor 102 is fluidly coupled to an inlet of the expander 110 through one or more heat exchangers (e.g., 104 and 106). The expander 110 is configured to expand the compressed fluid stream 202 received from the compressor 102 after passing through the one or more heat exchangers to increase the temperature of the compressed fluid stream 202.

The expander 110 includes a first outlet path 130 and a second outlet path 132. The first outlet path 130 is configured to extract the partially expanded high temperature fluid stream 210 from the expander 110 at an intermediate pressure i.e., a second pressure $P_2$. As $P_2$ is the pressure of the partially expanded fluid, $P_2$ is lower than $P_1$. According to the embodiments of the invention, $P_2$ is higher than the critical pressure of the fluid. That is the extracted fluid stream 210 includes the fluid in supercritical state. The second outlet path 132 is configured to deliver an exhaust fluid stream 212 from the expander 110 at a third pressure $P_3$, such that $P_3$ is lower than $P_2$. In some instances, the third pressure $P_3$ is higher than the critical pressure of the fluid. The second pressure $P_2$ is lower than the first pressure $P_1$, and higher than the third pressure $P_3$.

As used herein, the term "partially expanded fluid" or "partial expansion" refers to an expansion of the fluid less than about 100% expansion of the fluid in the expander. In some embodiments, the partial expansion refers to an expansion between about 5% expansion and about 90% expansion of the fluid in the expander. In some embodiments, the partially expended fluid is extracted between about 10% expansion and about 50% expansion of the fluid, and in some particular embodiments, between about 20% expansion and about 40% expansion of the fluid.

In some embodiments, a flow control device 134 is arranged in the system 100 to control a mass flow rate of the extraction of the partially expanded high temperature fluid stream 210 as shown in FIG. 1. An example of such device is a throttling valve. By controlling the mass flow rate, a desired mass flow can be extracted from the first outlet path 130 of the expander 110 at the second pressure $P_2$. This may allow control on the net power output of the system.

As mentioned previously, the compressed fluid stream 202 from the compressor 102 is supplied to the expander 110 via the one or more heat exchangers. In one embodiment, the system 100 includes a first heat exchanger 104 and a second heat exchanger 106 as illustrated in FIG. 1. The first heat exchanger 104 is fluidly coupled to the outlet of the compressor 102 to receive the compressed fluid stream 202 and deliver the compressed fluid stream 204. The second heat exchanger 106 is fluidly coupled to the first heat exchanger 104 to receive the compressed fluid stream 204 and deliver the compressed fluid stream 206. The first heat exchanger 104 and the second heat exchanger 106 are further fluidly coupled to the first outlet 130 and the second outlet 132 of the expander 110 to receive at least one of the partially expanded high temperature fluid stream 210 or the exhaust fluid stream 212 from the expander 110. The first heat exchanger 104 is configured to transfer heat from a combination of the partially expanded high temperature fluid stream 210 and the exhaust fluid stream 212 (received through the second heat exchanger 106) to the compressed fluid stream 202, thereby increasing the temperature of the compressed fluid and delivering a compressed fluid stream 204 at a relatively high temperature as compared to that of the compressed fluid stream 202.

By extracting the partially expanded high temperature fluid stream from the expander and regeneratively supplying the extracted high temperature fluid stream to the one or more heat exchangers for transferring heat to the low temperature compressed fluid stream i.e., using the extracted high temperature fluid stream for increasing the temperature of the low temperature compressed fluid stream provides a similar (substantially same) effect as achieved by the recompression, and thus removes the requirement of a recompressor.

The second heat exchanger 106 may be a high temperature recuperator. The second heat exchanger 106 is configured to transfer heat from the exhaust fluid stream 212 to the compressed fluid stream 204 received from the first heat exchanger 104, thereby further increasing the temperature of the compressed fluid stream 204 and delivering a compressed fluid stream 206 at a relatively high temperature than the compressed fluid stream 204. This whole process causes the temperature of the compressed fluid stream 202 from the compressor 102 to be increased prior to being received at a heat source 108, thereby reducing an amount of energy utilized by the heat source 108 to cause the temperature of the fluid to be suitable for provision to the expander 110.

On the other hand, the first heat exchanger 104 and the second heat exchanger 106 respectively decrease the temperature of the partially expanded high temperature fluid stream 210 and the temperature of the exhaust fluid stream 212 from the expander 110 prior to the fluid stream 214 being received at the precooler 114.

The system 100 further includes a heat source 108 that is fluidly coupled between the second heat exchanger 106 and the expander 110. The heat source 108 is configured to provide a thermal energy to the compressed fluid stream 206, and to deliver a heated compressed fluid stream 208. The heat source 108 may be any suitable heat source including, but not limited to, a fossil fuel heat source, a nuclear heat source, a geothermal heat source, a solar thermal heat source, or the likes.

As used herein, a heat exchanger is configured to exchange thermal energy (i.e., heat) between two fluid streams without bringing the two fluid streams in contact i.e., without combining the two fluid streams. This exchange or transfer of heat is generally known as indirect heating. A heat exchanger is distinguished from a heat source, as used herein, which is an external source of heat.

The heated compressed fluid stream 208 received from the heat source 108 is supplied to the inlet of the expander 110 such that the heated compressed fluid stream 208 expands due to the thermal energy provided by the heat source 108, and drives the expander 110. After expansion, the output fluid streams from the expander 110 i.e., the partially expanded high temperature fluid stream 210 and the exhaust fluid stream 212 remain at a high temperature but have lower pressures than the heated and compressed fluid stream 208 received at the inlet of the expander 102 i.e., $P_2$ and $P_3$ are lower than $P_1$.

In the illustrated embodiments, each of the partially expanded high temperature fluid stream 210 and the exhaust fluid stream 212 are regeneratively directed to at least one of the first heat exchanger 104 and the second heat exchanger 106 to transfer heat to the compressed fluid stream 202. After passing through at least one of the heat exchangers 104 and 106, the combination of the partially expanded fluid stream 210 and the exhaust fluid stream 212 is directed to the precooler 114. The precooler 114 is further fluidly coupled to the compressor 102 to supply the cool and expanded fluid stream 200 to the compressor 102.

In one embodiment, the precooler 114 includes a heat rejecter that rejects heat near the critical temperature of the fluid. The precooler 114 may include any suitable heat rejector, such as a liquid cooling system, a dry cooling system or the likes.

Figure 2:
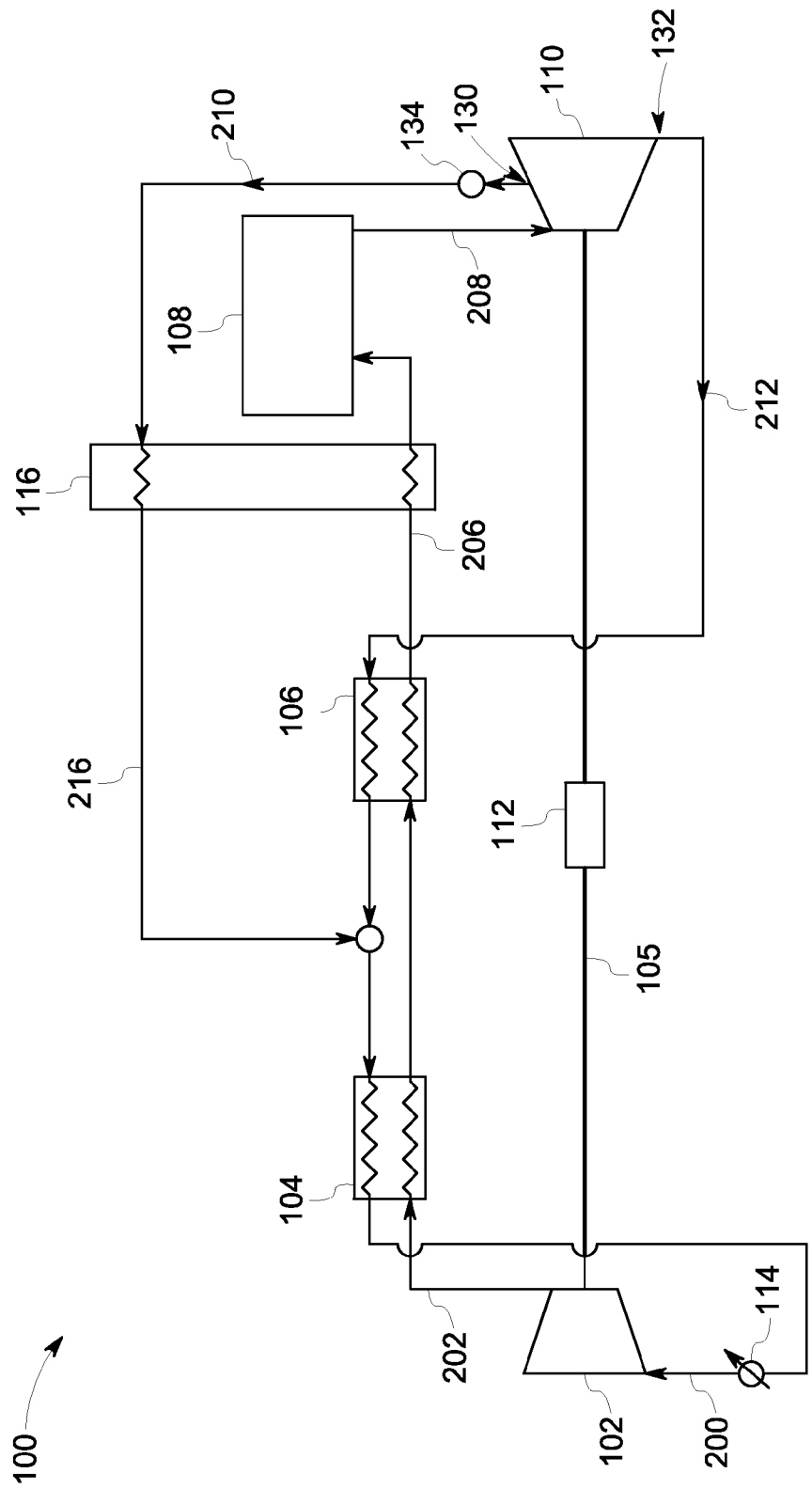
FIG. 2 is a schematic diagram of a regenerative closed loop Brayton cycle power generation system, in accordance with another embodiment of the invention.
Figure 3:
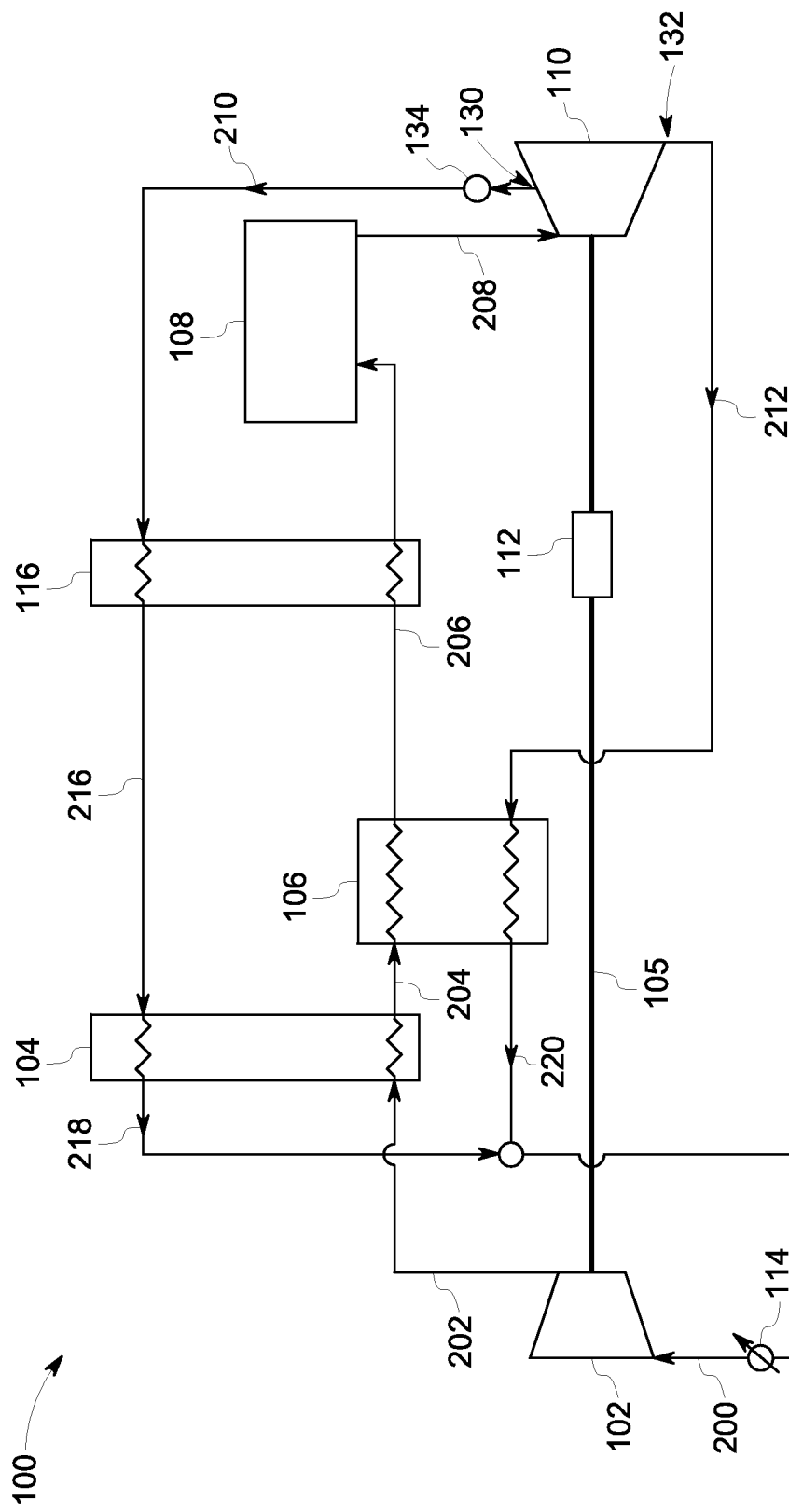
FIG. 3 is a schematic diagram of a regenerative closed loop Brayton cycle power generation system, in accordance with yet another embodiment of the invention.
Figure 4:
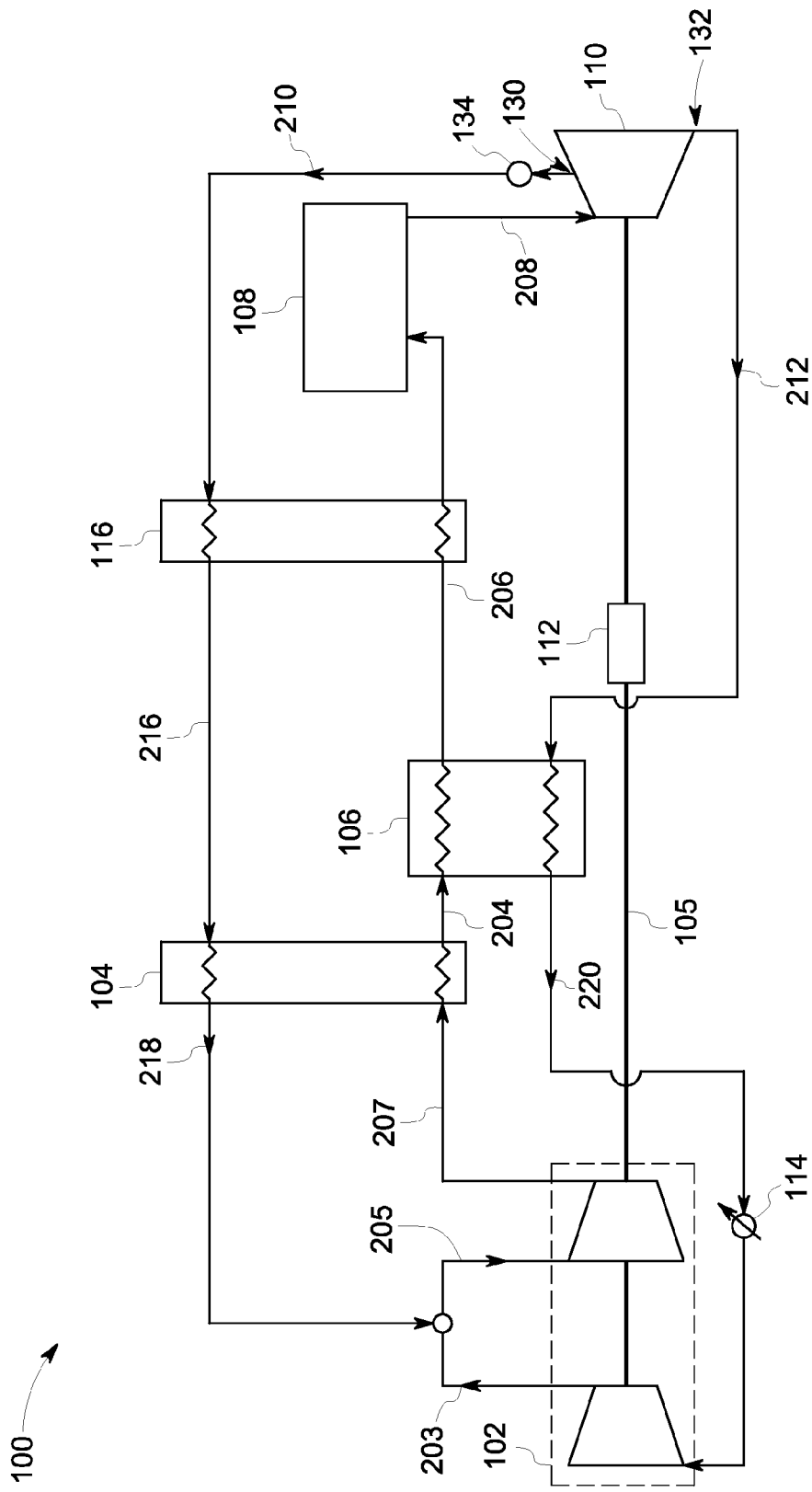
FIG. 4 is a schematic diagram of a regenerative closed loop Brayton cycle power generation system, in accordance with yet another embodiment of the invention.

In some embodiments, the system 100 further includes one or more additional heat exchangers to enhance the efficiency of the system. FIGS. 2-4 illustrate such systems. In FIG. 2, the system 100 further includes a third heat exchanger 116 fluidly coupled between the second heat exchanger 106 and the heat source 108. The third heat exchanger 116 is configured to transfer heat from the partially expanded high temperature fluid stream 210 (before being received at the first heat exchanger 104) to the compressed fluid stream 206 received from the second heat exchanger 106 prior to being received at the heat source 108. This further increases the temperature of the fluid stream 206 before being directed to the heat source 108, and reduces the amount of energy utilized by the heat source 108. Also, this heat transfer decreases the temperature of the partially expanded fluid stream 210 before being received at the first heat exchanger 104 i.e., provides a relatively cool (at a lower temperature) partially expanded fluid stream 216 towards the first heat exchanger 104 than the partially expanded high temperature fluid stream 210.

FIG. 3 illustrates an alternative arrangement of the first heat exchanger 104 and the second heat exchanger 106. The first heat exchanger 104 is configured to transfer heat from the partially expanded fluid stream 216 received after passing through the third heat exchanger 116 to the compressed fluid stream 202 received from the compressor 102. This heat transfer further increases the temperature of the compressed fluid stream 202 before entering the second heat exchanger 106 and reduces the temperature of the partially expanded fluid stream 216 received after passing through the third heat exchanger 116. A partially expanded fluid stream 218 at a temperature relatively lower than the partially expanded fluid stream 216, is received from the first heat exchanger 104. The second heat exchanger 106 is configured to transfer heat from the exhaust fluid stream 212 received from the second outlet 132 of the expander 110, thereby increasing the temperature of the compressed fluid stream 204 received from the first heat exchanger 104 and reducing the temperature of the exhaust fluid stream 212. A relatively cool exhaust fluid stream 220 (that has lower temperature than the exhaust fluid stream 212) is received from the second heat exchanger 106. A combination of the relatively cool partially expanded fluid stream 218 and the relatively cool exhaust fluid stream 220 is supplied to the precooler 114.

FIG. 4 illustrates an embodiment that includes direct heating of the compressed fluid stream 202. Direct heating refers to an exchange of heat between two fluid streams by contacting i.e., combining the two fluid streams. As illustrated in FIG. 4, the pressurization step is performed in a plurality of stages. The partially expanded fluid stream 218 is combined with a partially compressed fluid stream 203. The combined fluid 205 is further compressed to achieve a compressed fluid stream 207 at a pressure near to $P_1$ (higher than the critical pressure of the working fluid). In this embodiment, the compressed fluid stream 207 is at a relatively high temperature than the compressed fluid stream 202 of a system as described in other embodiments. This compressed stream 207 is supplied to the plurality of heat exchangers, and eventually to the expander 110 for the operation of the system. This arrangement thus may improve the efficiency of the system 100.

Figure 5:
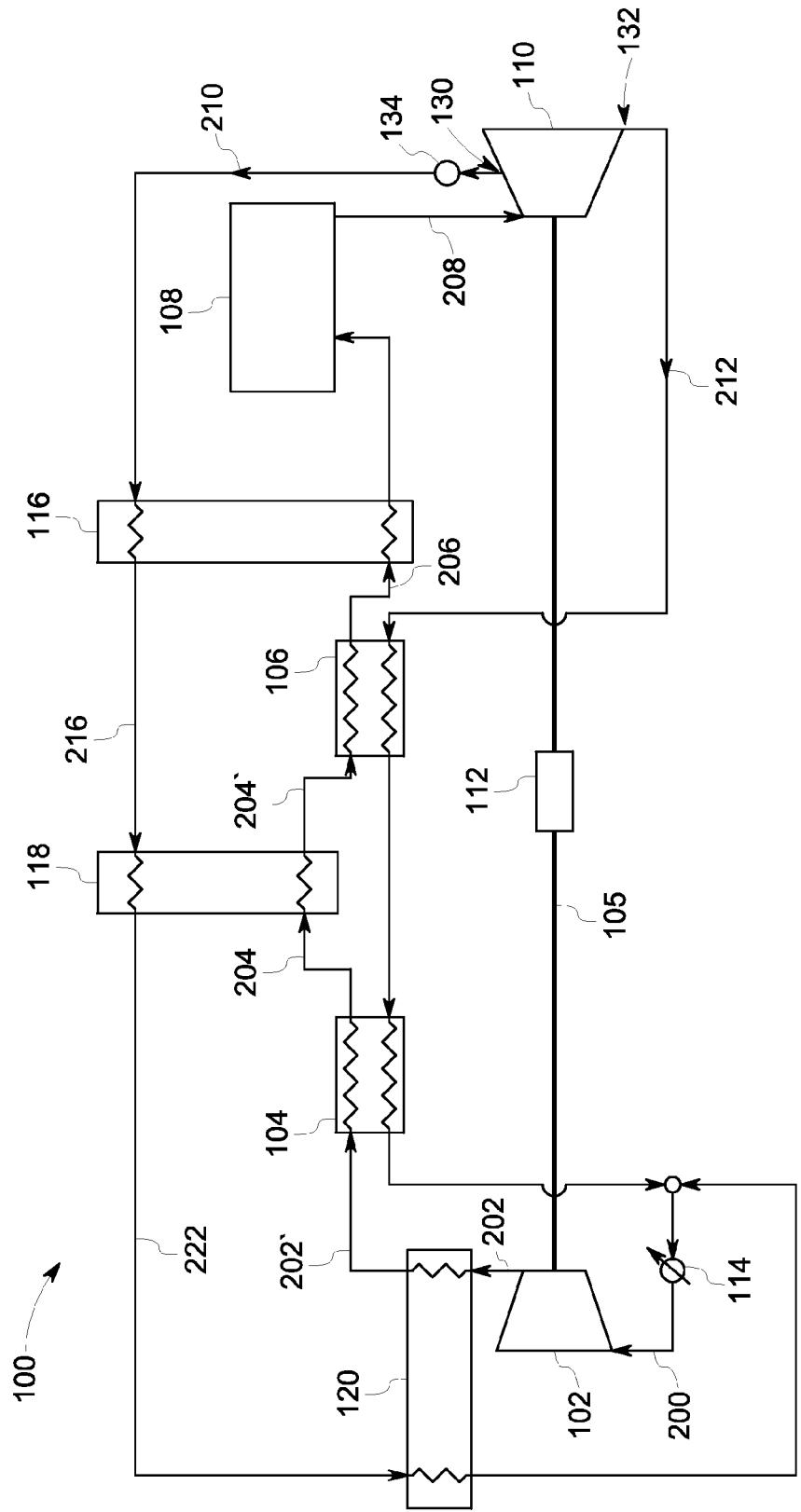
FIG. 5 is a schematic diagram of a regenerative closed loop Brayton cycle power generation system, in accordance with yet another embodiment of the invention.

As illustrated in FIG. 5, the system 100 further includes a fourth heat exchanger 118 and a fifth heat exchanger 120. The fourth heat exchanger 118 is fluidly coupled between the first heat exchanger 104 and the second heat exchanger 106. The fourth heat exchanger 118 is configured to transfer heat from the partially expanded fluid stream 216 received from the third heat exchanger 116 to the compressed fluid stream 204 received after passing through the fifth heat exchanger 120 and the first heat exchanger 104, and deliver a partially expanded fluid stream 222 at a temperature relatively lower than the partially expanded fluid stream 216. This arrangement increases the temperature of a compressed fluid stream 204' before entering the second heat exchanger 106. The fifth heat exchanger 120 is fluidly coupled between the first heat exchanger 104 and the compressor 102, and configured to transfer heat from the partially expanded fluid stream 222 received from the fourth heat exchanger 118 to the compressed fluid stream 202 received from the compressor 102. This heat transfer increases the temperature of a compressed fluid stream 202' before entering the first heat exchanger 104. At the same time, the temperature of the partially expanded fluid stream 222 is further reduced before received at the precooler 114.

As used in the claims, the word "comprises" and its grammatical variants logically also subtend and include phrases of varying and differing extent such as for example, but not limited thereto, "consisting essentially of" and "consisting of." Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language; and these variations should also be construed where possible to be covered by the appended claims.

The invention claimed is:

1. A closed loop regenerative thermodynamic power generation cycle system, comprising:
a pressurization device configured to pressurize a working fluid, and to deliver a working fluid stream, wherein the working fluid stream is at a first pressure ($P_1$), wherein $P_1$ is higher than a critical pressure of the working fluid;
a first heat exchanger fluidly coupled to the pressurization device and receiving the working fluid stream from the pressurization device, and the first heat exchanger is configured to transfer heat to the working fluid stream, wherein the working fluid stream is at $P_1$;
a second heat exchanger fluidly coupled to the first heat exchanger and receiving the working fluid stream from the first heat exchanger, and configured to transfer heat to the working fluid stream; and
an expander fluidly coupled to the second heat exchanger and receiving the working fluid stream from the second heat exchanger, and configured to expand the working fluid stream, wherein the working fluid stream is at $P_1$, to produce mechanical energy; wherein the expander comprises:
a first outlet path to extract a partially expanded portion of the working fluid stream from the expander, wherein the partially expanded portion of the working fluid stream is at a second pressure ($P_2$), and to regeneratively supply the partially expanded portion of the working fluid stream to the first heat exchanger; wherein $P_2$ is lower than $P_1$, and $P_2$ is higher than the critical pressure of the working fluid; and
a second outlet path to provide an exhaust fluid stream from the expander wherein the exhaust fluid stream is at a third pressure ($P_3$), and to regeneratively supply the exhaust fluid stream to the second heat exchanger, wherein $P_3$ is lower than $P_2$.

2. The closed loop regenerative thermodynamic power generation cycle system of claim 1, wherein the pressurization device comprises a compressor configured to compress a supercritical working fluid.

3. The closed loop regenerative thermodynamic power generation cycle system of claim 1, wherein the working fluid comprises carbon dioxide.

4. The closed loop regenerative thermodynamic power generation cycle system of claim 1, further comprising a heat source fluidly coupled between the second heat exchanger and the expander, wherein the heat source is configured to receive the working fluid stream from the second heat exchanger, wherein the working fluid stream is at $P_1$, and to supply the working fluid stream to the expander.

5. The closed loop regenerative thermodynamic power generation cycle system of claim 1, wherein the expander includes a device selected from an axial flow turbine, a radial flow turbine, a reciprocating engine and a combination thereof.

6. The closed loop regenerative thermodynamic power generation cycle system of claim 1, further comprising an electrical generator coupled to the expander.

7. The closed loop regenerative thermodynamic power generation cycle system of claim 1, further comprising a precooler configured to supply the working fluid to the pressurization device.

8. The closed loop regenerative thermodynamic power generation cycle system of claim 1, further comprising a flow control device to control a mass flow rate of the extraction of the partially expanded portion of the working fluid stream.

* * * * *